United States Patent [19]
Walker

[11] 4,180,139
[45] Dec. 25, 1979

[54] FLUID OPERATED SEISMIC GENERATOR

[75] Inventor: Garland H. Walker, Houston, Tex.

[73] Assignee: Western Geophysical Co. of America, Houston, Tex.

[21] Appl. No.: 905,491

[22] Filed: May 12, 1978

Related U.S. Application Data

[63] Continuation-in-part of Ser. No. 804,116, Jun. 6, 1977, abandoned.

[51] Int. Cl.$^2$ .............................................. G01V 1/38
[52] U.S. Cl. .................................... 181/120; 181/115
[58] Field of Search ....................... 181/115, 118, 120; 340/12 R

[56] References Cited

U.S. PATENT DOCUMENTS

| | | |
|---|---|---|
| 2,827,260 | 3/1958 | Jordan . |
| 3,394,775 | 7/1968 | Cole et al. .............................. 181/120 |
| 3,482,646 | 12/1969 | Brown et al. .......................... 181/120 |
| 3,738,446 | 6/1973 | Nottingham ........................ 340/12 R |
| 3,800,832 | 4/1974 | Umphenour et al. ................. 181/120 |
| 3,896,898 | 7/1975 | Kirby et al. ............................ 181/120 |
| 3,949,831 | 4/1976 | Cassand et al. ....................... 181/120 |
| 4,033,429 | 7/1977 | Farr ....................................... 181/120 |
| 4,049,078 | 9/1977 | Paitson et al. ........................ 181/120 |

Primary Examiner—Howard A. Birmiel
Attorney, Agent, or Firm—William A. Knox

[57] ABSTRACT

In the field of seismic exploration, compressed-air guns may be used as sound sources. Known air guns employed complex valving and were wasteful of compressed air. The air gun sound source of this invention is of simple construction and is economical of compressed air.

The gun (10) consists of an elongated housing (34) that has at least one radially-positioned exhaust port. The housing is charged with a volume of compressed air. A hollow cylindrical actuator (60) is mounted inside the housing and may be hydraulically or pneumatically driven within the housing in longitudinal strokes. The actuator has at least one radially positioned aperture (88) alignable with the exhaust port. A valve or sealing pad (96) is mounted in each aperture. An orifice (104) is cut into each pad. At one end of an actuator stroke, the valve blocks the exhaust port in the housing. When the shuttle is driven from one end of the housing to the other, as the valve orifice passes by the exhaust port, the exhaust port is opened momentariliy to allow the explosive escape of some of the compressed air in the gun. As the actuator completes its stroke to the other end of the housing, the exhaust port is again blocked.

15 Claims, 8 Drawing Figures

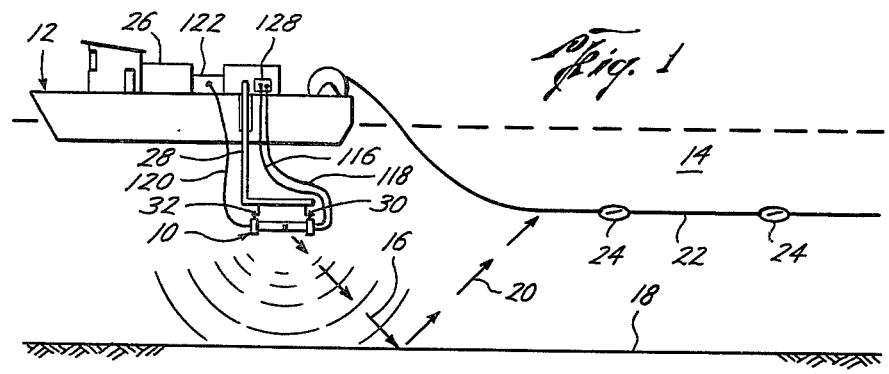
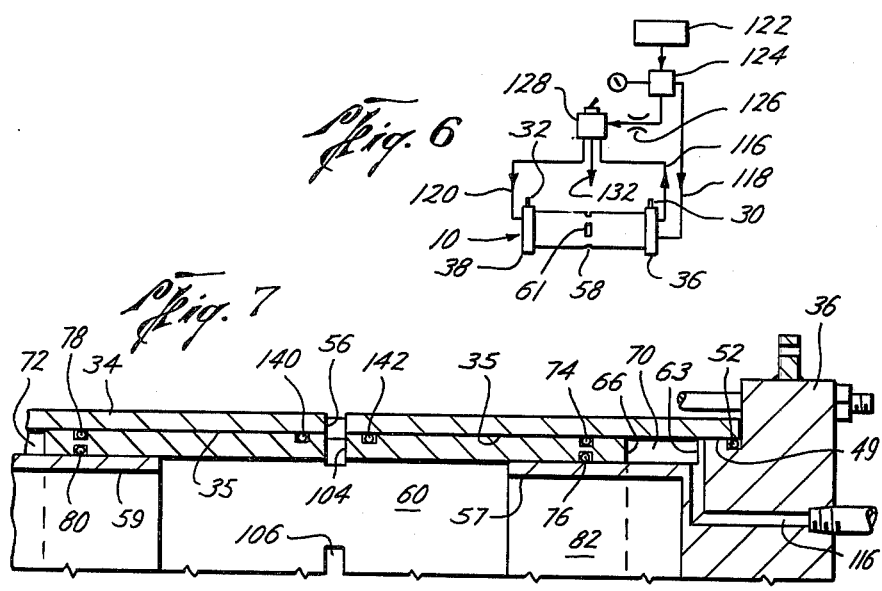
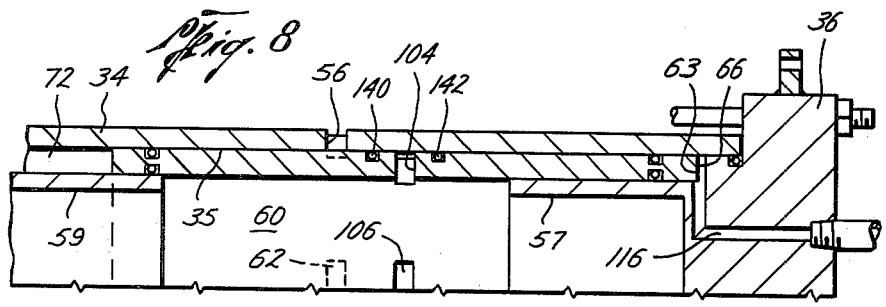

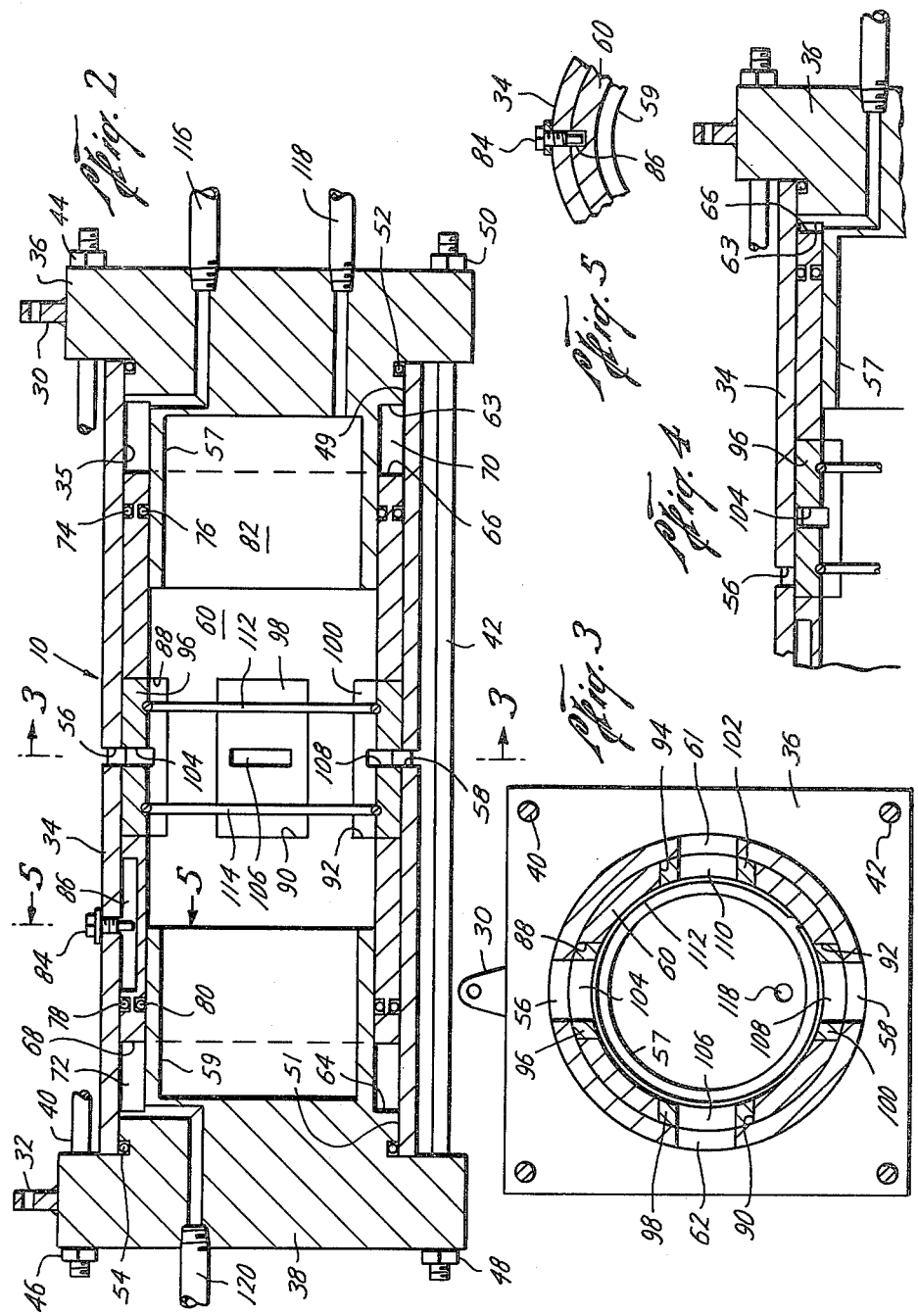

FLUID OPERATED SEISMIC GENERATOR

CROSS REFERENCE TO RELATED APPLICATIONS

This application is a continuation-in-part of U.S. patent application Ser. No. 804,116, now abandoned, filed June 6, 1977 and assigned to the assignee of this invention.

BACKGROUND OF THE INVENTION

1. Field of the Invention

This invention relates to devices used for the sudden release of energy and in particular it relates to seismic sound sources such as air guns, used to release a pressurized gas such as air, into a body of water in order to observe the reflected or refracted waves resulting therefrom during seismic exploration.

2. Technical Description of the Prior Art

Conventional air guns contain a gas under pressure, usually air, compressed to 500 to 8000 lb/in$^2$ (3.448×10$^6$ to 55.16×10$^6$ Newtons/m$^2$). A valve mechanism is mechanically, pneumatically, or hydraulically actuated to suddenly release the compressed air over a period of a few milliseconds to generate an acoustic impulse.

In general, a conventional air gun has at least two chambers: a control chamber and a firing chamber. Usually, the two chambers are in fluid communication with each other via restricted metering passageways so that the air pressure can be equalized between the two chambers. The firing chamber is provided with exhaust ports which, when the gun is cocked, are sealed by a valve such as a sliding sleeve, piston, or plunger valve. The valves, of whatever type, have two faces of different areas. The valve face exposed to the air pressure in the control chamber has the greater area. Accordingly, the differential forces acting against the two valve faces, hold the valve closed to seal the exhaust ports. To fire the gun, the differential forces are upset by lowering the pressure in the control chamber, or by slightly raising the pressure in the firing chamber. The pressure in the firing chamber forces the valve to abruptly open so that the air in the firing chamber explosively escapes through the exhaust ports. To open the exhaust ports, the valve moves in one direction only. Moving in the opposite direction, the valve closes the exhaust ports.

As noted above, valve members used in air guns may be of sleeve or plunger type and of the piston type. Sleeve or plunger valve members are moved by an actuator or driving mechanism against a seat to block the escape of high pressure air through the exhaust ports. The actuator then moves the valve member away from the seat in a direction parallel to the plane of the exhaust port. In the piston type, the valve member moves perpendicular to the plane of the exhaust port. In all types, the actuating or drive mechanism drives the valve member in one direction to unblock the exhaust ports. The actuator then reverses the direction of motion of the valve member to drive it back against the seat so that the firing chamber can be recharged. Valve actuators must control large forces and typically require several complex amplification stages to perform their task.

U.S. Pat. No. 3,638,752 to Wakefield shows an air gun using a cylindrical sliding sleeve valve that abuts against a seat to close the exhaust ports. U.S. Pat. No. 3,039,292 to Ottestod reveals a plunger-type valve member. Typical piston type valves are shown in U.S. Pat. No. 3,276,534 to Ewing and U.S. Pat. No. 3,310,128 to Chelminski.

The two major disadvantages of the conventional, above-described guns are related to the speed of operation and the complexity of the valve actuator or driving mechanism, required to control the large forces involved.

The prior-art air guns were wasteful of air because of their low speed of operation. The requirement for valve-member motion-reversal, that is, motion in a first direction to open the valve and motion in the reverse direction to close the valve, created an unavoidable lengthy period of time during which the exhaust ports remained open. Of course, compressed air bled from the firing chamber throughout the entire period that the valve was open during a firing cycle. It is known that it is only the initial outrush of air, which takes place just as the valve member first opens the exhaust ports, that generates useful acoustic energy. Further release of air contributes nothing to the strength of the acoustic pulse and is wasteful.

It is a general object of this invention to provide an air gun having faster valve operation so that it expends a minimum amount of compressed air during each firing cycle, thereby permitting use of a smaller air compressor than was hitherto deemed possible. Another object of this invention is to reduce the complexity of the gun and to eliminate metering passageways and multistage poppet and solenoid pilot valves.

SUMMARY OF THE INVENTION

My invention provides a seismic sound source for releasing underwater a high-pressure gas, which expends a minimum of compressed gas during each firing cycle, and which has a minimum of moving parts.

A chamber is provided for containing the compressed gas and includes an exhaust port through which the gas may be released. A valve member is mounted for motion in the chamber and may be positioned against the exhaust port in several sealing portions to block the port. The valve member has an orifice therethrough. The valve member may be moved by an actuator in a continuous motion, without reversing direction, from one sealing position, through a firing position wherein the orifice is aligned with the exhaust port, thence to another sealing position.

To fire the gun again, the valve member may be returned to the first sealing position. For additional firings the valve member may be driven back and forth between the two positions in alternate strokes, resulting in one firing for each stroke.

In a preferred embodiment of the invention, the valve member includes a resiliently-mounted, low-friction pad having an orifice, which is moved by the actuator parallel to the plane of the exhaust port in a linear motion.

BRIEF DESCRIPTION OF THE DRAWINGS

Other features and advantages of this invention will be better understood by reference to the drawings and the accompanying description wherein:

FIG. 1 is a schematic representation of the manner of use of an air gun in seismic exploration;

FIG. 2 is a detailed cross-sectional view of the gun illustrated schematically in FIG. 1;

FIG. 3 is a cross-sectional view taken along 3—3' of FIG. 2;

FIG. 4 is a partial cross-sectional view of the shuttle in the closed position;

FIG. 5 is a cross-sectional view taken along line 5—5'' of FIG. 2;

FIG. 6 is a plumbing diagram for use in operating the gun of this invention;

FIG. 7 is a sectional view of an alternate embodiment employing O-rings, shown with the shuttle centered; and FIG. 8 is a sectional view similar to FIG. 7 with the exhaust ports blocked.

DETAILED DESCRIPTION OF THE PREFERRED EMBODIMENT

The seismic sound source of this invention is an air gun 10 (FIG. 1) towed by a boat 12 through a body of water 14 for generating therein an acoustic pulse 16. When the acoustic pulse travels outwards from gun 10, it impinges upon a subsurface layer 18 and is reflected therefrom as a seismic wave or signal 20.

The reflected seismic waves 20 are detected by hydrophones (not shown) mounted in a long streamer cable 22. Streamer cable 22 is towed by boat 12 and is held at a desired depth by depth controller 24. The detected seismic waves are converted to electrical signals and are transmitted to a recording system 26 on boat 12 by any well-known means.

Air gun 10 is suspended from boat 12 by a mounting frame or bridle 28, that is attached to gun 10 by lugs 30, 32 on opposite ends of the gun 10.

In a preferred embodiment, gun 10 (FIG. 2) consists of a cylindrical outer housing 34 secured between two end plates 36, 38 which are clamped together by tie bolts 40, 42, and nuts 44, 46, 48, 50. Actually, four sets of tie bolts and nuts are used but only two sets are shown in FIG. 2. Housing 34 fits over shoulders 49, 51, machined on the inner faces of the respective end plates. O-rings 52, 54 installed around shoulders 49, 51 provide an airtight seal between housing 34 and end plates 36, 38. Outer housing 34 and end plates 36 and 38 define an enclosed chamber. Outer housing 34 has four slot-shaped exhaust ports 56, 58, 61, 62 that are disposed radially around a circumference of the housing. Although slots are illustrated, any other shape may be used. Also, tie bolts and nuts are the preferred assembly method but other structural designs may be used.

Hollow, cylindrical bosses 57,59 are attached to the inside faces of end plates 36, 38. The bosses may be welded in place and subsequently machined to the desired size after welding. The outer diameters of the bosses are somewhat less than the inside diameter of housing 34 to provide room for and to support a sliding shuttle assembly or actuator 60, described below. Lugs 30 and 32 are welded to end plates 36, 38 to accept a towing bridle 28 (FIG. 1). Housing 34 and end plates 36, 38 are made of metal having a high tensile strength such as steel to resist bursting when the gun is under pressure as described below.

A tubular shuttle or actuator assembly 60 fits inside housing 34, around bosses 57 and 59, and is free to slide to-and-fro between stops 63 and 64 which form a part of shoulders 49, 51 on end plates 36, 38. The volumes between the housing and the bosses and beteen ends 66, 68 of shuttle 60 and stops 63, 64 form annular subchambers 70, 72 inside the chamber defined by outer housing 34 and end plates 36, 38. O-rings 74, 76, 78, 80, mounted on each end of shuttle 60, seal subchambers 70, 72 from fluid communication with an inner chamber 82 that is formed by the interiors of bosses 57, 59 and tubular actuator 60. Actuator 60 is restrained from rotating radially by a stud 84 screwed through housing 34 into a keyway 86 milled longitudinally along part of the outer surface of the actuator (FIGS. 2 and 5). Actuator 60 is preferably made of aluminum so as to present minimal inertia when it slides to-and-fro.

Four apertures 88, 90, 92, 94 are cut radially into actuator 60 midway between the two ends 66 and 68 (see FIGS. 2 and 3). As shown, the apertures are rectangular, but any other shape may be used. Four sealing pads 96, 98, 100, 102 having slot-shaped orifices or vents 104, 106, 108, 110 are mounted to slide into corresponding apertures 88, 90, 92, 94 of shuttle 60. The sealing pads form the valve members of actuator 60. The sealing pads are conveniently made of hard, durable low-friction plastic such as Nilatron. The pads are cut to make a sliding fit into their corresponding apertures. The outer faces are curved to conform to the curvature of the inner curved wall surface 35 of housing 34. The pads are held in place and float against the inner wall 35 of housing 34 by spring retainers 112, 114. Spring retainers are preferred, but any other means, such as brackets, could be used to keep the pads from falling out of the apertures in the actuator when the gun is not in use. As will be seen below, in use the internal air pressure holds the pads in place against the housing wall. The wall thickness of actuator 60 is such as to allow a small clearance between bosses 57, 59 and the inner wall 35 of housing 34 so that the shuttle will slide freely. Slotted orifices or vents 104, 106, 108, 110 may be the same size as slotted exhaust ports 56, 58, 61, 62 in housing 34, or they may be larger or smaller, depending on the design requirements. Similarly, other shapes such as circular holes may be preferred.

End plate 36 is provided with an actuating-fluid inlet 116, and a firing-air inlet 118. End plate 38 has but one actuating-fluid inlet 120. Compressed air or hydraulic fluid under pressure is supplied to the inlets through hoses (not shown in FIG. 2) as will be discussed later in connection with a plumbing diagram, FIG. 6.

The principles of operation of the gun are as follows (assuming the actuating fluid is compressed air): when the gun is to be placed in operation, compressed air is admitted through inlet 120. Entering annular subchamber 72, the compressed air drives actuator 60 to the right so that end face 66 rests against stop 63. Referring to FIG. 4, it will be seen that sealing pad or valve 96, in a first sealing position, blocks exhaust port 56 in housing 34. It should be understood, of course, that the other three exhaust ports are similarly blocked by their corresponding pads. With the exhaust ports closed, firing air is admitted to central chamber 82 inside shuttle 60 through inlet 118. The firing-air pressure is in range of 2000–6000 psi. With the force of the air inside chamber 82 pressing the four sealing pads against inner wall 35 of housing 34, the exhaust ports 56, 58, 61, 62 are tightly closed. The gun is now armed.

To fire the gun, the air is suddenly released from annular sub-chamber 72 and at the same time compressed air is admitted through inlet 116 into subchamber 70, causing actuator 60 to accelerate impulsively to the left, against stop 64 placing the sealing pads or valves in a second sealing position. As the orifices 104, 106, 108, 110 pass by exhaust ports 56, 58, 61, 62, the exhaust ports are momentarily uncovered and some of the compressed air in chamber 82 escapes explosively to create the desired acoustic pulse. Thus, in one linear motion, the shuttle moves from sealing, to an open, to another sealing position in rapid succession. The actual period of time that the exhaust ports are open is on the order of a few milliseconds. The gun is fired a second time by reversing the above process, exhausting the air in annular subchamber 70 and repressurizing annular subchamber 72 to drive the shuttle back to the right. The gun is repeatedly fired as the shuttle is driven in to-and-fro strokes alternately, first in one direction and then the other as described, emitting an acoustic pulse every time the sealing-pad orifices pass by and become aligned with the corresponding exhaust ports during each stroke.

The lengths of bosses 57 and 59 are not critical. They merely serve as guides for actuator 60 and serve to create the annular subchambers 70 or 72 when actuator 60 and valve members or sealing pads 96, 98, 100, 102 are in one sealing position or the other. In fact, the two bosses could be extended to form a continuous tubular member (not shown), having one or more air vents directly opposite the exhaust ports 56-62 in outer housing 34 so that compressed air can escape from the inner chamber 82 through the exhaust ports when actuator 60 executes a to-and-fro stroke. Thus the gun assembly may consist of an outer tubular housing 34, closed at both ends by end plates 36, 38; a first inner tubular member 60, concentric with and mounted for motion within the housing and a second tubular member, which may be split into two segments 57 and 59, sealed against the inner surface of tubular member 60.

The pulse shape, the energy released and the quantity of air consumed can be adjusted by the design parameters of the shapes and sizes of the exhaust ports and the shuttle travel speed. The shuttle speed is, in turn, controlled by the rate of air release from a one of the annular chambers 70 or 72, and the flow rate of new compressed air into the opposite chamber. The pressure of the actuating air (or hydraulic fluid, if used) is not critical but it must be great enough to overcome the stiction and friction of the sealing pads or valves 96, 98, 100, 102, and the O-rings pressing against inner wall 35 of housing 34. Between 1500 and 2000 psi has been found sufficient.

A plumbing diagram useful in actuating the gun 10 is shown in FIG. 6. Air compressor 122 (FIGS. 1 and 6) supplies compressed air at the desired firing-air pressure. The air is delivered to junction 124 where a part of the air is delivered over line 118 into the chamber 82 (FIG. 2) of gun 10. Another portion of the air flows through pressure reducing valve 126 to two-position, three-way valve 128. In one position air is exhausted from one end of gun 10 through line 116 and is vented to waste through line 132 and at the same time, air is admitted to the other end of gun 10 through line 120 to fire the gun. In the other position of three-way valve 128, the reverse operation takes place. Valve 128 is shown as a manual valve but in actual practice it would be power-driven by suitable means. If a hydraulic driving fluid is preferred, the plumbing system of FIG. 6 could be appropriately modified by well-known means.

This invention has been described in terms of a preferred embodiment employing floating sealing pads or valves to block the exhaust ports. It would be feasible to eliminate the sealing pads and to substitute two O-rings, one on each side of orifices 106-110, encircling the outer circumference of the shuttle, bearing against inner wall 35 of housing 34. Referring to FIGS. 7 and 8, there are shown sectional views of an alternate embodiment, with the actuator 60 open in FIG. 7 and closed in FIG. 8. In FIG. 7 the orifices 104 and 106 (two are shown, but four or more may be used) are cut directly into the wall of actuator 60. O-rings 140 and 142 encircle the shuttle, astraddle exhaust port 56 in housing 34. Bearing against inner wall 35 of housing 34, O-rings 78, 80, 140, 142, 74, and 76 block exhaust port 56 from fluid communication with annular subchambers 70 and 72, and from inner chamber 82 of shuttle 60 except when orifices or vents 104, 106 are aligned with exhaust ports 56 and 58 as in FIG. 7. When actuator 60 is driven against stop 63, FIG. 8, O-rings 78 and 140 cause the exhaust ports such as 56 and 58 to be blocked. When shuttle 60 is driven against the opposite stop (not shown in FIGS. 7 or 8) then exhaust ports 56 and 58 are blocked by O-rings 74 and 142.

Similarly, although the exhaust ports are shown as slots, each one could be a single, circular hole of a relatively large diameter, or a set of radially-disposed smaller holes could be used in place of the slots. Or the exhaust ports could be slots and the orifices in the sealing pads could be small holes distributed along the long dimension of the slots or vice versa.

In the illustrations, only one set of four radially-disposed exhaust ports with matching orifices is shown. However, several sets each having more than four exhaust ports and matching orifices, distributed at intervals along the length of the gun, could be introduced.

The invention has been described in terms of use of compressed air to actuate the shuttle. It is to be understood that the shuttle could equally well be actuated by pressurized hydraulic fluid.

I claim as my invention:

1. A seismic sound source for releasing gas under pressure into a body of water, comprising:
    a chamber for containing the gas including an exhaust port through which the gas may be released;
    a valve member mounted for motion within the chamber and positionable against the exhaust port in a plurality of sealing positions to block release of the gas from the chamber, the valve member including an orifice therethrough; and
    an actuator for rapidly moving the valve member to and fro in a continuous linear motion from a first sealing position to a second different sealing position through an open position in which the orifice is aligned with the exhaust port to release some of the gas.

2. The seismic sound source of claim 1 wherein the actuator includes:
    means for rapidly returning the valve member in a continuous motion from the second sealing position to the first sealing position, through the open position to again release some of the gas.

3. The seismic sound source of claim 1 wherein the valve member includes:
    a flexibly mounted sealing surface that is urged against the exhaust port in a sealing position by the pressure of the gas in the chamber.

4. The seismic sound source of claim 3 wherein the sealing surface comprises:
    a low friction material in contact with the chamber so that the friction that resists motion of the valve member is reduced.

5. The seismic sound source of claim 4 wherein the orifice is in and through the low friction material.

6. The seismic sound source of claim 2 wherein the actuator means includes:
   sealing means for forming a first subchamber in the chamber in the first sealing position and for forming a second subchamber in the second sealing position; and
   means for providing fluid under pressure to the first subchamber in the first sealing position and to the second subchamber in the second sealing position for driving the valve member between the two positions.

7. The seismic sound source of claim 2 wherein the chamber is elongate and the actuator moves the valve member in a linear motion therewithin.

8. The seismic sound source as defined in claim 2 wherein the motion of said valve member is parallel to the plane of said exhaust port.

9. The seismic signal generator as defined in claim 2 wherein:
   said pressurized fluid is a compressible gas and said means for driving is hydraulically actuated.

10. The seismic sound source of claim 9, including:
    an outer tubular housing closed at both ends forming the chamber therein and wherein the actuator includes a first inner tubular member having inner and outer surfaces concentric with the outer housing, mounted for motion within said housing.

11. The seismic sound source of claim 10 wherein the valve member includes:
    a pair of sealing rings surrounding the orifice mounted on the outer surface of the inner member in sliding contact with the inner surface of the outer housing.

12. The seismic sound source of claim 10 wherein the inner tubular member includes an aperture therein and the valve member includes:
    a sealing pad of resilient material having an orifice and mounted in the aperture.

13. The seismic sound source of claim 12 including:
    a retainer for urging the pad in the aperture against the inner surface of the outer housing.

14. The seismic sound source as defined in claim 12 including:
    a second inner tubular member having vents, in fixed relationship to said outer housing and sealed against the inner surface of said first tubular member.

15. A seismic signal generator for producing an acoustic impulse in a body of water comprising:
    a closed housing having an exhaust port;
    a shuttle having an aperture, for containing a volume of pressurized gas, mounted for linear to-and-fro motion within said housing;
    a sealing pad having an orifice, mounted in said aperture for releasably sealing said exhaust port; and
    means for driving said shuttle in alternate to-and-fro strokes so that each time said sealing-pad orifice passes said exhaust port, it is aligned with and opens said exhaust port to release a portion of said pressurized gas.

* * * * *